US010081432B2

(12) United States Patent
Rossi et al.

(10) Patent No.: US 10,081,432 B2
(45) Date of Patent: Sep. 25, 2018

(54) DRONE STRUCTURE

(71) Applicant: UNIVERSITA DEGLI STUDI DI FIRENZE, Florence (IT)

(72) Inventors: Guglielmo Rossi, Florence (IT); Sandro Moretti, San Casciano Val di Pesa (IT); Nicola Casagli, Vaglia (IT)

(73) Assignee: UNIVERSITA DEGLI STUDI DI FIRENZE, Florence (IT)

( * ) Notice: Subject to any disclaimer, the term of this patent is extended or adjusted under 35 U.S.C. 154(b) by 176 days.

(21) Appl. No.: 14/917,299

(22) PCT Filed: Sep. 5, 2014

(86) PCT No.: PCT/IB2014/064278
§ 371 (c)(1),
(2) Date: Mar. 8, 2016

(87) PCT Pub. No.: WO2015/036907
PCT Pub. Date: Mar. 19, 2015

(65) Prior Publication Data
US 2016/0214728 A1    Jul. 28, 2016

(30) Foreign Application Priority Data

Sep. 10, 2013  (IT) ................. PI2013A0081

(51) Int. Cl.
*B64C 27/08*      (2006.01)
*B64D 27/26*      (2006.01)
*B64C 39/02*      (2006.01)

(52) U.S. Cl.
CPC .............. *B64D 27/26* (2013.01); *B64C 27/08* (2013.01); *B64C 39/024* (2013.01);
(Continued)

(58) Field of Classification Search
CPC . B64C 39/024; B64C 2201/108; B64C 27/08; B64C 2201/165; B64C 11/28;
(Continued)

(56) References Cited

U.S. PATENT DOCUMENTS 3,053,480 A * 9/1962 Vanderlip ............... B64C 27/54
244/17.13
2012/0083945 A1   4/2012 Oakley et al.

FOREIGN PATENT DOCUMENTS

DE   102005003028 A1   7/2006
DE   102007054126 A1   5/2009
(Continued)

OTHER PUBLICATIONS

Jasper Van Loenen ("DIY (Drone It Yourself".*
(Continued)

*Primary Examiner* — Assres H Woldemaryam
(74) *Attorney, Agent, or Firm* — Ladas & Parry LLP; Malcolm J. MacDonald

(57) ABSTRACT

A structure of drone (100) comprises a frame (110) comprising an engagement portion (110'), said engagement portion (110') being a strip having a predetermined geometry. The structure of drone (100) also comprises a plurality of propulsion elements (120). Each propulsion element (120) is arranged, in use, to be engaged in a removable way to the engagement portion (110') at a any point of the strip, in such a way to easily change the number and the arrangement of the propulsion elements (120) present on the engagement portion (110').

12 Claims, 17 Drawing Sheets

(52) U.S. Cl.
CPC .. *B64C 2201/027* (2013.01); *B64C 2201/042* (2013.01); *B64C 2201/108* (2013.01); *B64C 2201/123* (2013.01); *B64C 2201/16* (2013.01)

(58) Field of Classification Search
CPC .............. B64C 2230/28; B64C 39/02; B64C 2027/8227; B64C 27/00; B64C 27/473; B64D 27/26; B64D 27/08
See application file for complete search history.

(56) References Cited

FOREIGN PATENT DOCUMENTS

| DE | 202011050944 U1 | 10/2011 | | |
|---|---|---|---|---|
| EP | 2497555 A1 | * | 9/2012 | ............. A63H 27/12 |
| JP | 2002347698 A | 12/2002 | | |

OTHER PUBLICATIONS

Waybackmachine date for "DIY (Drone It Yourself)".*
International Search Report dated Feb. 18, 2015, corresponding to International Patent Application No. PCT/IB2014/064278.
Jasper Van Loenen: DIY (Drone It Yourself)—Jasper van Loenen, Aug. 5, 2013, Retrieved from the Internet: URL: http://web.archive.org/web/20130805090632/http://jaspervanloenen.com/diy.
Anonymous:"Skyartec MC01-1 Butterfly 4CH RC Quadcopter RTF 2.4GHz w/ 6-Axis Gyro", Aug. 11, 2013, Retrieved from the Internet: URL:http://web.archive.org/web/2013081103059/http://www.rc-fever.com/skyartec-mc01-1-butterfly-4ch-m-quadcopter-rtf-24ghz-w-6-axis-gyro.html.

* cited by examiner

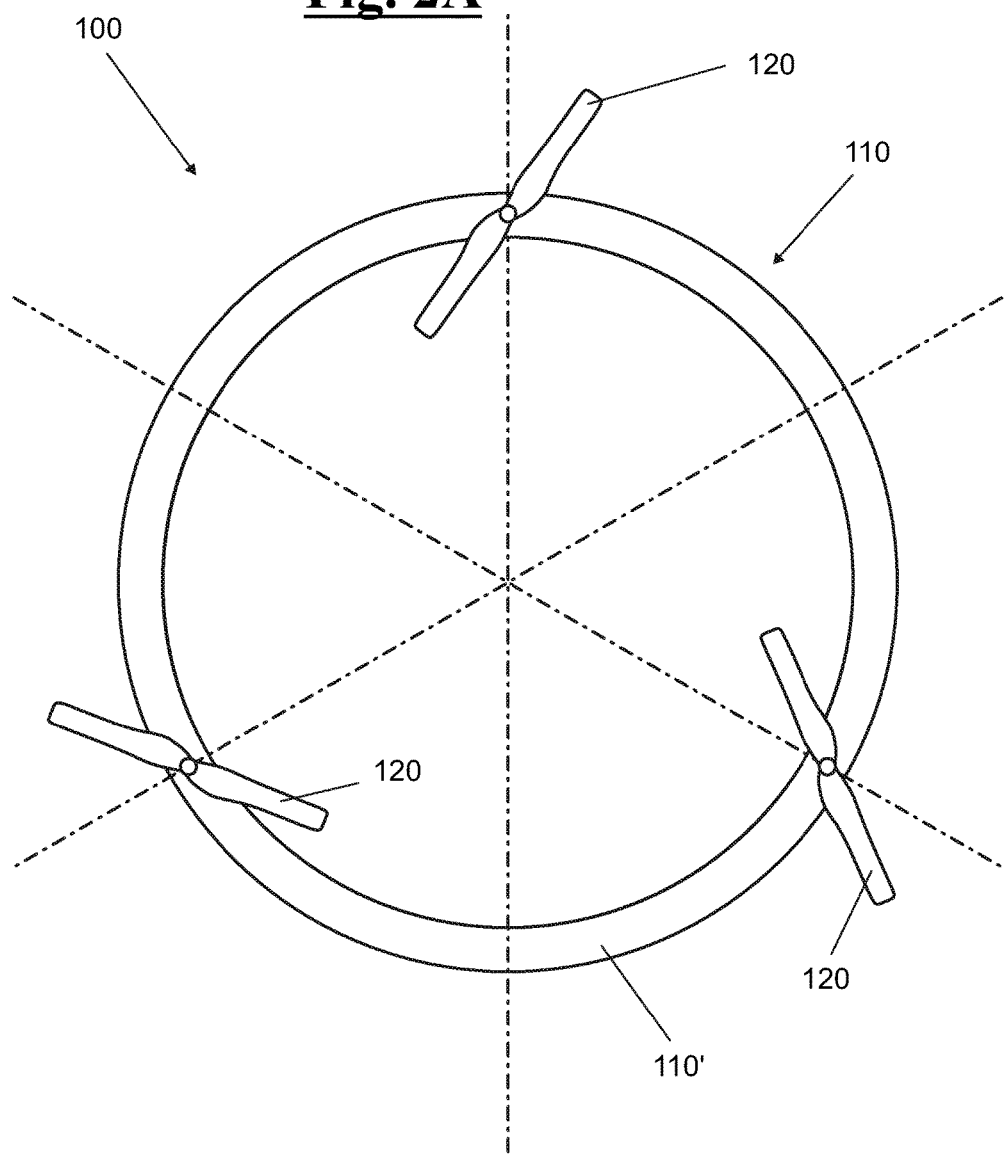

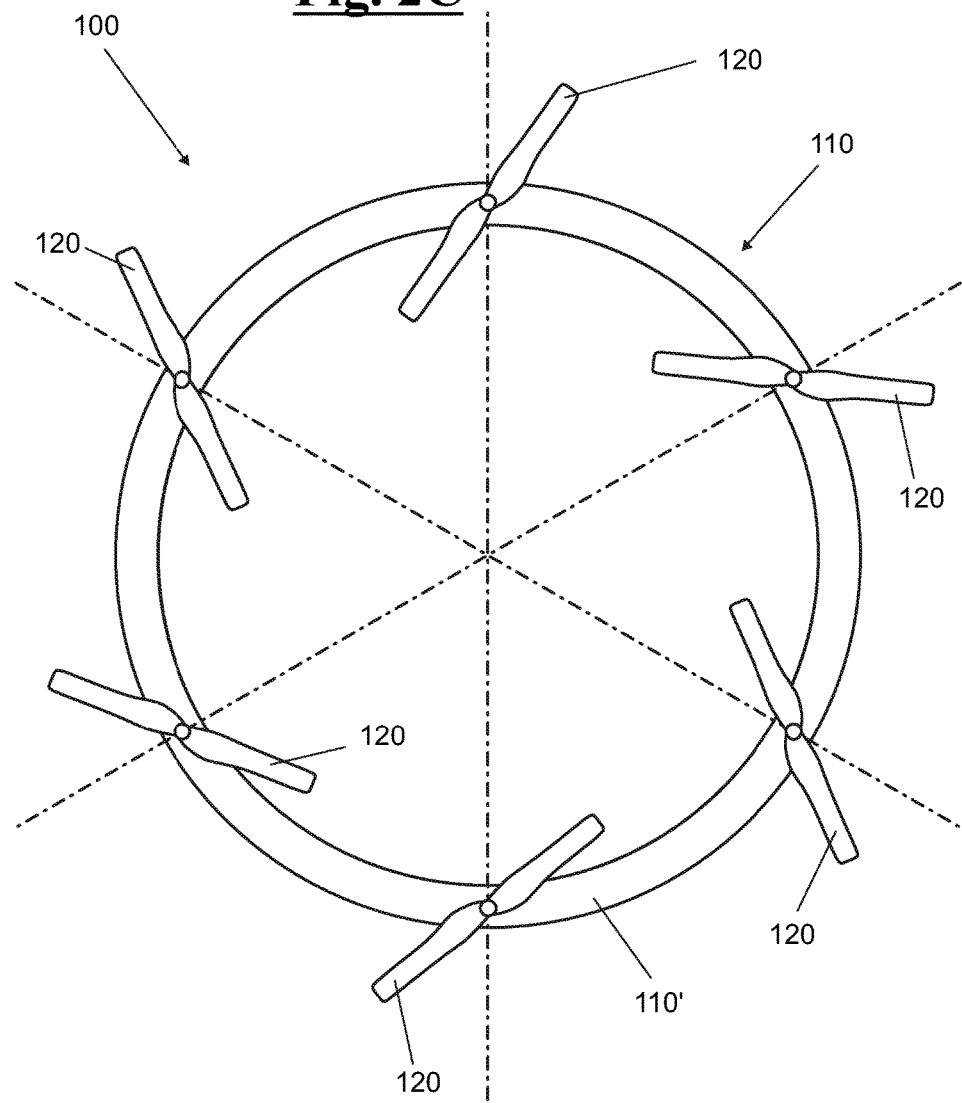

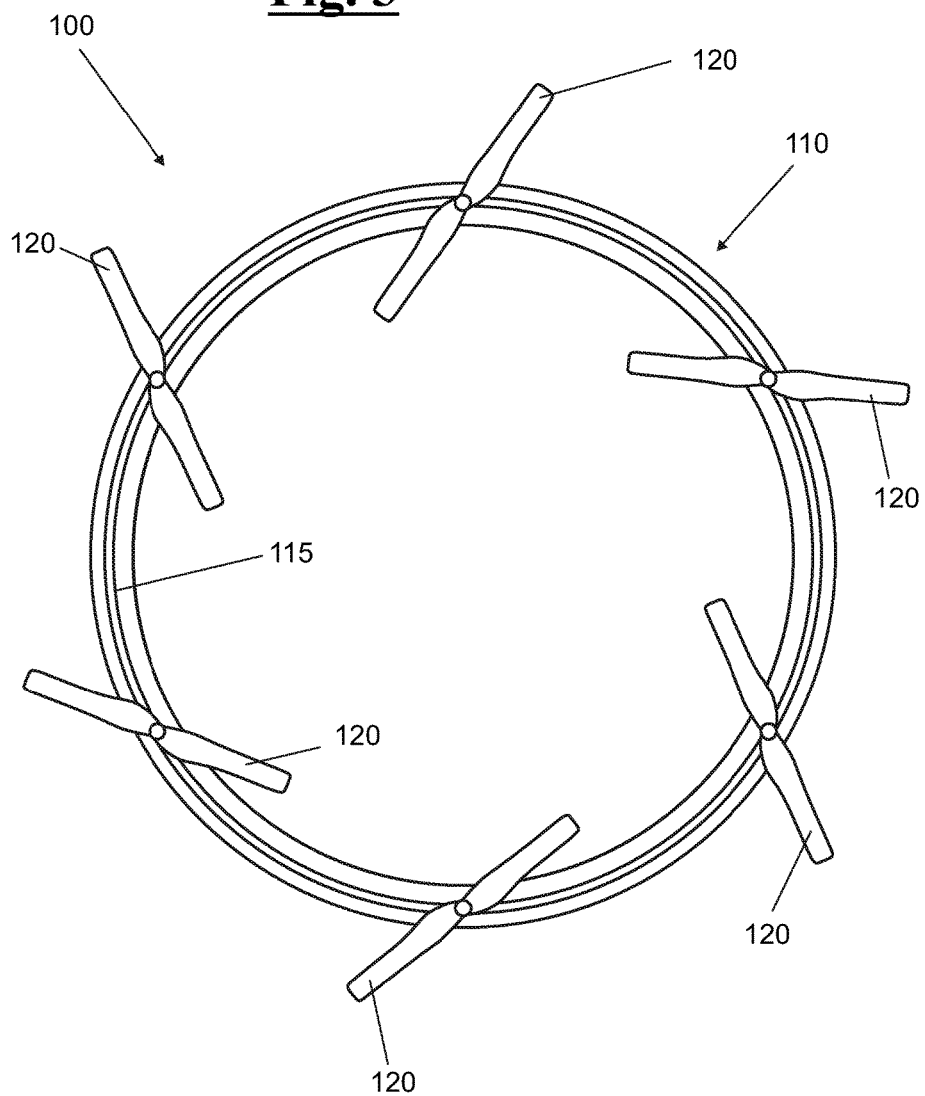

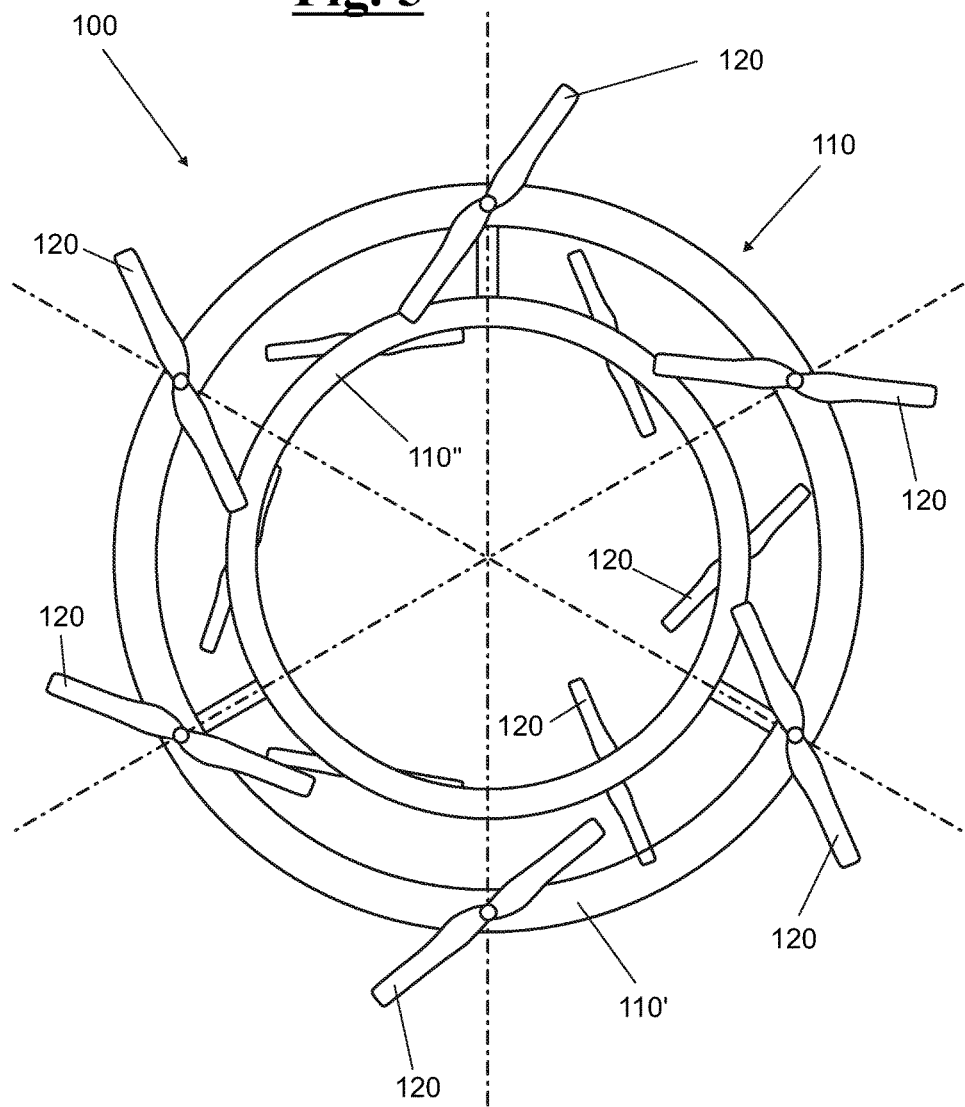

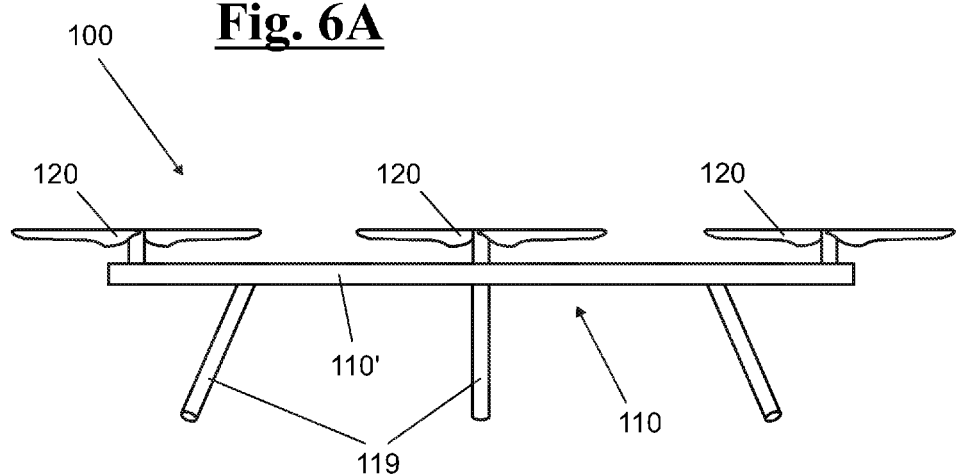
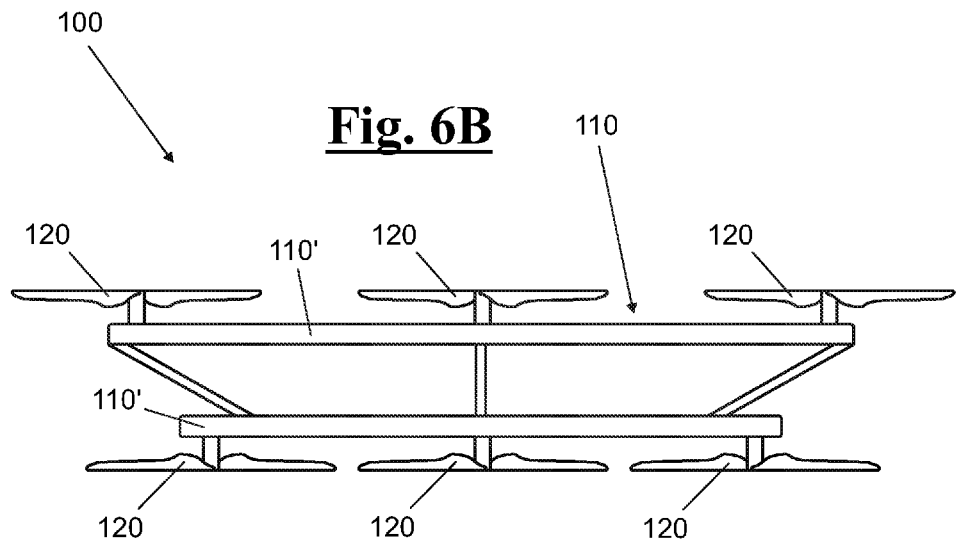

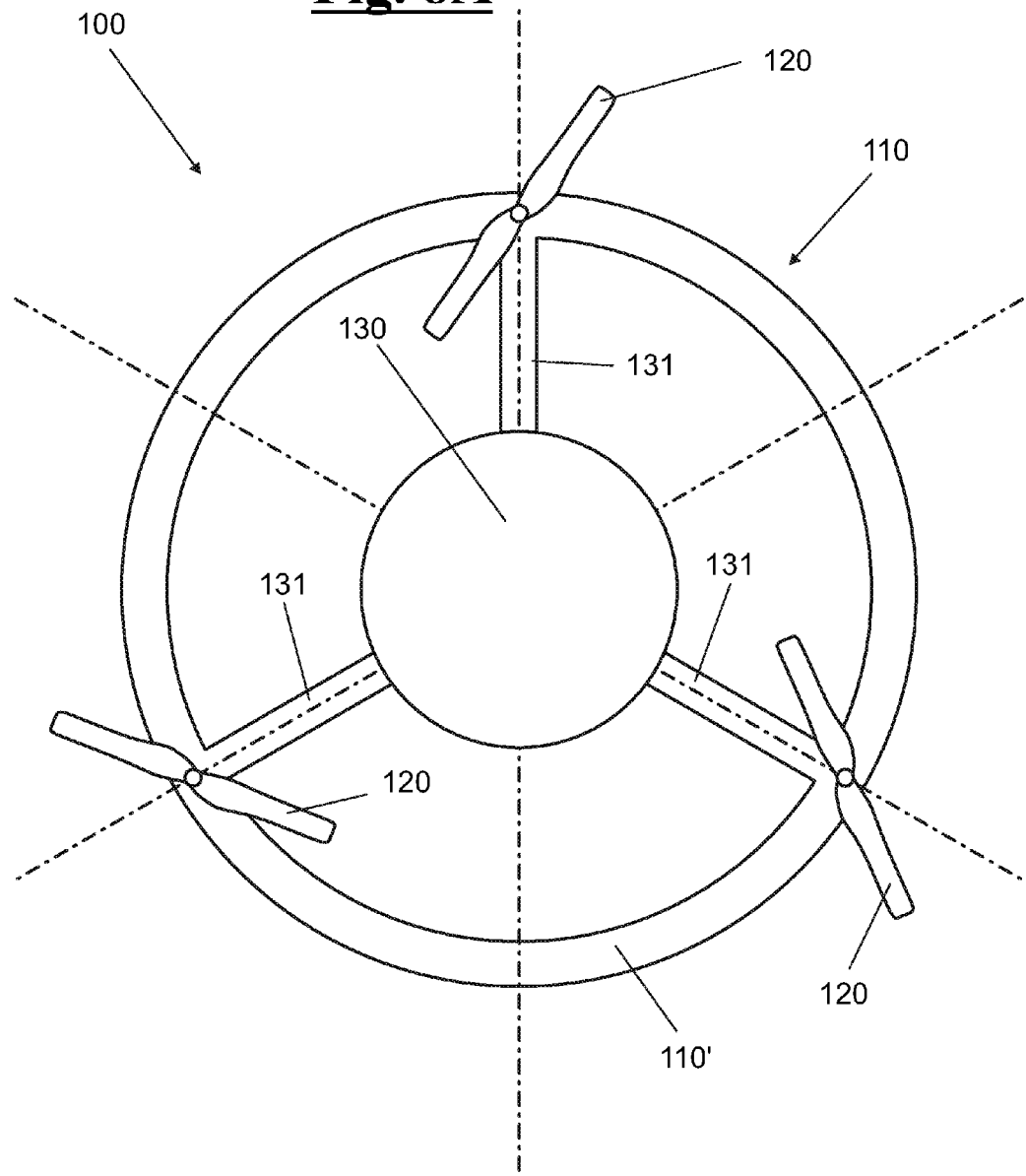

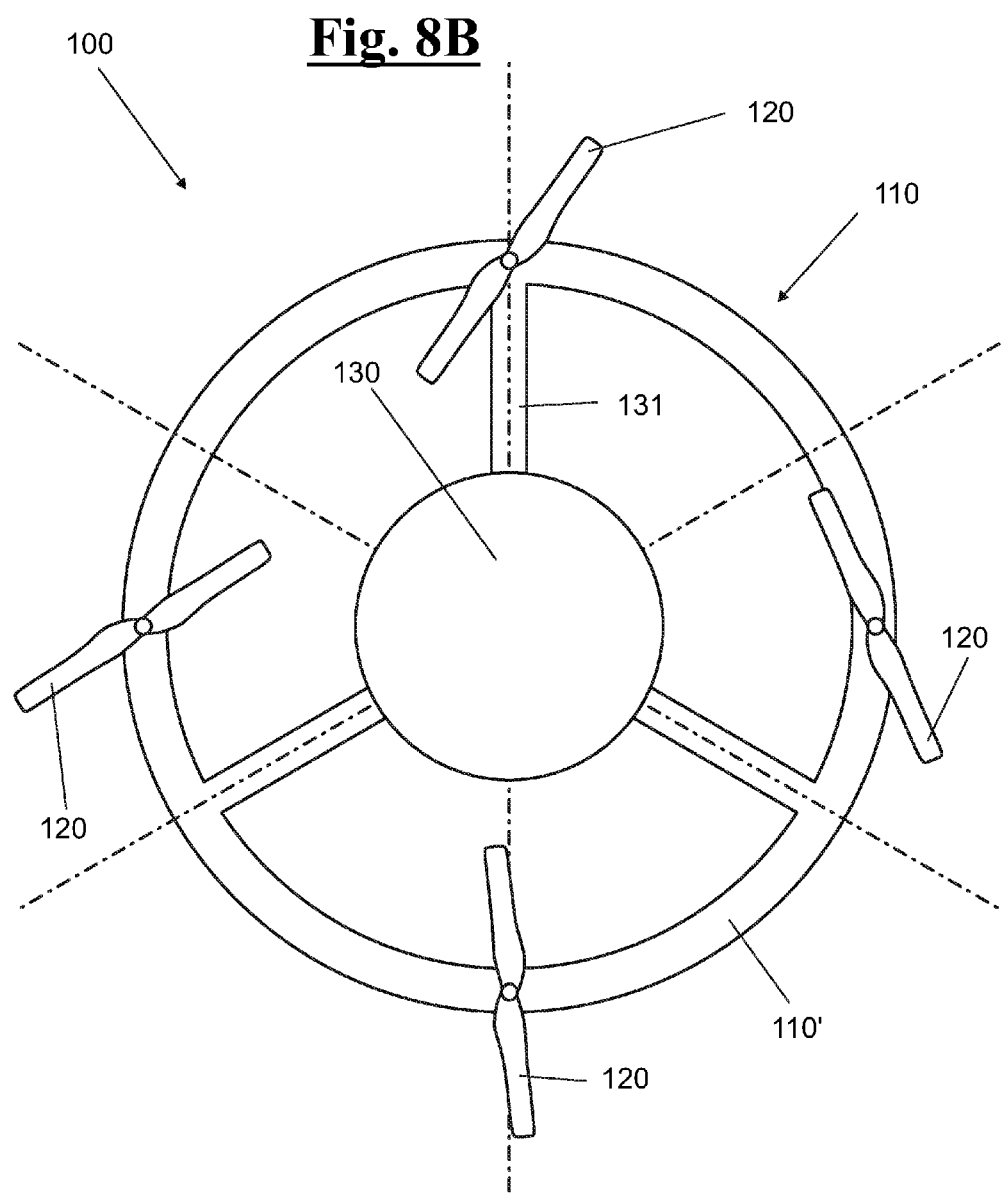

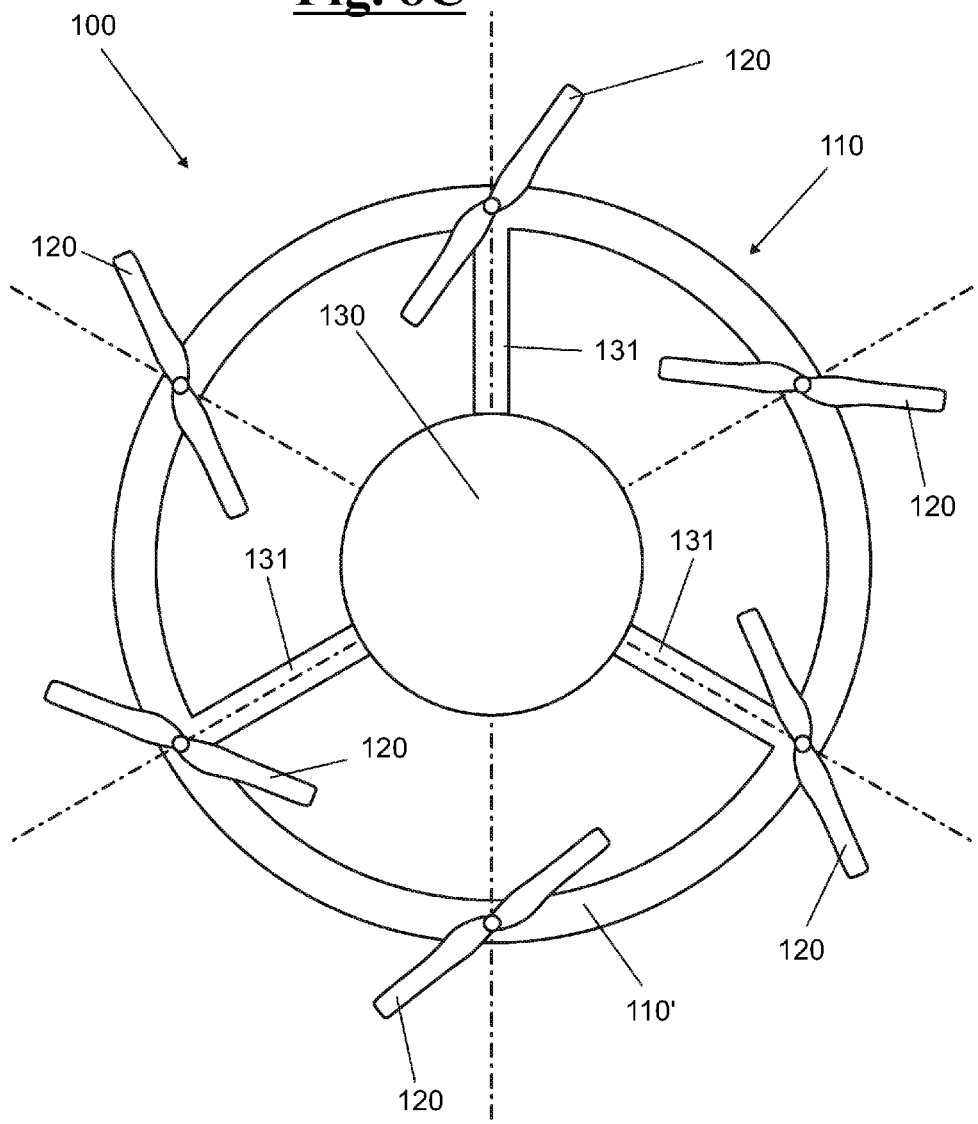

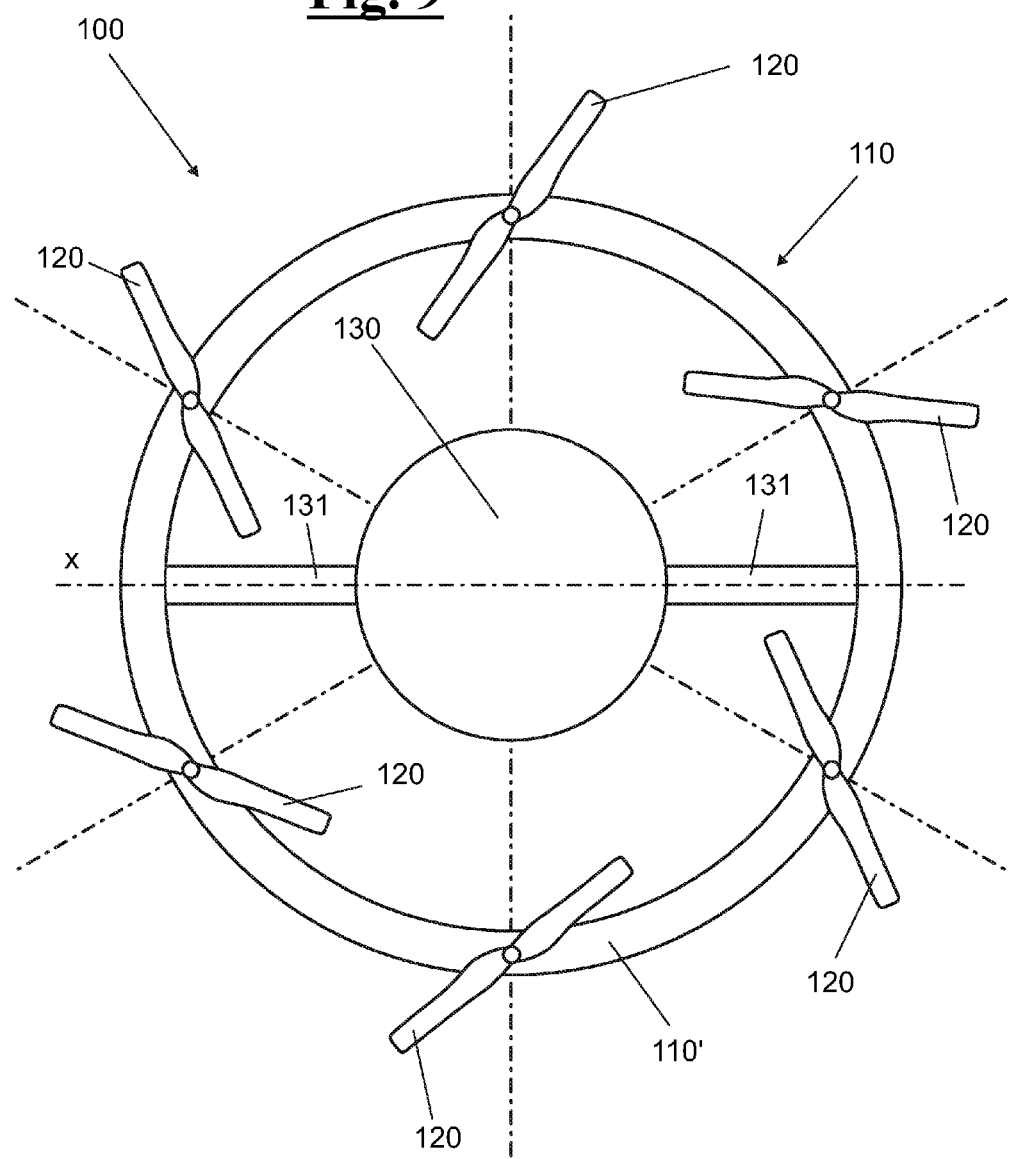

DRONE STRUCTURE

FIELD OF THE INVENTION

The present invention relates to the field of aviation by drones.

DESCRIPTION OF THE PRIOR ART

There are known several types of drones for navigation and visual recognition in areas that are generally not accessible to physical people. These types of drones are essentially aircrafts for fixed point flight that are raised and controlled by rotors or propellers independently operated. The orientation and the speed of aircraft can be controlled by varying the thrust generated by each of the rotors.

The use of aircrafts for fixed point flight is particularly important for collecting digital images or videos in real time from aerial observation points. For example, this can result essential after a natural disaster or a major accident, as it can provide detailed images to the rescuers about the current situation.

A fundamental requirement of such aircrafts is to have a low overall weight of the structure, in particular to avoid an excessive energy waste to maintain the drone in flight.

Furthermore, since such aircrafts are generally controlled by a remote control, a problem often encountered is that possible hidden obstacles can damage the propellers compromising the success of the flight mission. For this, in addition to being essential to provide an appropriate protection to the propellers, it is also important providing that such propellers can be easily and quickly removed and replaced, in order to restore the functionality of the drone without the need to replace it completely.

An example of drone which allows to obviate this problem is shown in US20090283629A1. The drone described comprises a central body and a set of replaceable arms that extend beyond the central body. Each of such arms is provided with a vertical axis rotor adapted to provide the propulsion of aircraft.

However, this solution has some drawbacks, firstly in terms of weight and structural resistance. Since, in fact, the arms extend outwardly beyond the central body, they need external shielding for protection of the rotors, causing an increase both of the overall weight and of the bending moment at the root of the arms themselves. Such bending moment, notwithstanding it can result reduced as static load, it can result instead particularly expensive as fatigue load, since arms are continuously subject to fluctuation. Furthermore, the weight of the arms itself further increases the overall weight of aircraft. Another problem of the device described in US20090283629A1 regards its versatility. In fact, it does not provide the possibility of change the layout and the number of the propellers obtaining different arrangements, and this reduces the possibility to adjust the lift generated by the propellers to various loads and flight missions.

The same drawbacks are also present in the commercial product "Skyartec MC01-1 Butterfly 4CH RC Quadcopter RTF 2.4 GHz w/ 6-Axis Gyro", which does not allow to easily change the number and the layout of the propellers, in order to adapt to various loads and flight missions.

SUMMARY OF THE INVENTION

It is therefore a feature of the present invention to provide an improved structure of drone that has a reduced weight with respect to the drones of the prior art.

It is also a feature of the present invention to provide an improved structure of drone that has high structural strength.

It is also a feature of the present invention to provide an improved structure of drone that protects propellers and payload by hits and damages.

It is a further feature of the present invention to provide an improved structure of drone that allows to vary the propulsive arrangement by easily changing the layout and the number of the propellers, in order to adapt to various payloads and flight missions.

It is still a feature of the present invention to provide an improved structure of drone that allows to automate the variation of the propulsive arrangement, in order to carry out this variation during the flight, without needing to be returned to the ground.

These and other objects are achieved by a structure of drone comprising:
- a frame comprising an engagement portion, said engagement portion being a strip having a predetermined geometry;
- a plurality of propulsion elements;
- wherein each propulsion element is arranged, in use, to be engaged in a removable way to the engagement portion at any point of the strip, in such a way to easily change the number and the arrangement of the propulsion elements present on the strip itself.

With the term strip it is meant a three-dimensional structure with a size much larger than the other two. Along the much larger size the propulsion elements are arranged.

This particular structure of the frame allows to overcomes the drawbacks present in the drones of the prior art, both in terms of weight and in terms of structural strength and impact protection, since it is not necessary the presence of a central payload and, therefore, of arms arranged to connect the payload to the propellers.

Furthermore, the propulsion elements can be arranged, in a easily removable way, at any point along the strip that forms the engagement portion, and they are not constrained to be located in predetermined points, as it is carried out for all the drones of the prior art. This makes it possible to obtain a big versatility of the drone both in terms of flight mission and in terms of payload.

Advantageously, each propulsion element is slidingly mounted on the engagement portion to be arranged from a starting engagement position to a final engagement position, different from the starting engagement position, through a sliding along the engagement portion itself, remaining engaged to the frame.

In particular, the propulsion elements are propellers.

Alternatively, the propulsion elements can be jet engines.

In particular, the predetermined geometry is selected from the group consisting of:
- a annular geometry with a circular plan;
- a annular geometry with a square plan;
- a annular geometry with a triangular plan;
- a annular geometry with a hexagonal plan;
- a C-shaped geometry.

In particular, the engagement portion has a plurality of engagement positions, and each propulsion element is arranged to be engaged to the engagement portion at any of the engagement positions, in order to obtain a predetermined propulsion configuration among a plurality of possible obtainable propulsion configurations.

This way, it is possible to provide more easily some editable and customizable propulsion configurations, or pattern. This allows the drone to quickly adapt to various weights and balances of the payload, and to different propulsion powers required by the particular flight missions.

Advantageously, the frame comprises a secondary engagement portion, which also has a shape of a strip having a predetermined geometry, in order to increase the lift generated by the propulsion elements.

In particular, the plurality of propulsion elements is arranged in axially symmetric with respect to a geometric centre of the frame.

Advantageously, is also provided an load unit connected to the frame and arranged to support a predetermined load.

The load unit can help the frame to support the sensors for the navigation of the drone and the visual recognition of the area crossed during the flight.

Advantageously, each engagement position comprises a threaded hole and each propulsion element comprises a threaded portion arranged to be inserted into the threaded hole, in such a way that the propulsion element engages with the frame.

Alternatively, each propulsion element can be engaged to the frame by a mechanical terminal, a snap closure, a magnet, an electromagnet, an adhesive element or a combination thereof.

In particular, can be provided a rail, or a rotating disc on the engagement portion, that allows to modify in a quick and safe way the position of the propulsion elements, without the need to remove them by the frame.

Advantageously, the frame comprises actuating means arranged to automatically cause the sliding of the propulsion elements on the strip.

In particular, the actuating means comprises a carriage, or a rotating actuator, which can be operated, in order to cause the sliding of the propulsion elements on the strip in a automatic way or with remote controls. This aspect is particularly useful for changing the arrangement of the propulsion elements during the flight mission, for example in case of sudden unbalance of the drone due to a wind gust, or to accumulated material, and especially in case that one of the propellers will break.

Advantageously, a control unit is provided arranged to operate the propulsion elements for carrying out a power control of each propulsion element. By providing, for example, to individual propulsion elements a differentiated power, it is possible to cause the drone carrying out the desired flight manoeuvres, as tack, yaw or pitch, and this way, it is possible to lead the drone itself along a determined path.

Advantageously, at least one inertial sensor is also provided for carrying out a detection of the distribution of the masses of the structure of drone and/or of a possible additional load. The inertial sensor is also arranged to transmit the detection done to a control unit, which is arranged to determine in a differential way the power and/or the engagement position of each propulsion element, in order to obtain a predetermined propulsion configuration. This allows the control unit, not only to operate the flight manoeuvres of the drone, but also t change the propulsion configuration, in order to balance the most the structure of drone and a possible additional load.

In particular, at each engagement position a LED indicator is provided arranged to selectively turn on/off as a result of a command of the control unit, in order to visually indicate the optimal engagement positions for engaging the propulsion elements.

This way, the control unit can indicate the optimal positions with which engage the propellers according to the inertia and to the balancing of the transported load. if, for example, the load comprises an elongated object that strongly unbalances the equilibrium of the drone, it is necessary, as well as differentiate the power of the individual propellers, also dispose the propellers in a "unbalanced" way and not axialsymmetric way.

According to another aspect of the invention a structure of drone comprises a frame having an engagement portion provided with a plurality of engagement positions for a plurality of propulsion elements, each propulsion element being engaged to the engagement portion at a respective engagement position.

Advantageously, each propulsion element is slidingly mounted on the engagement portion in order to be arranged from a starting engagement position to a final engagement position through a sliding along the engagement portion, remaining engaged to the frame.

According to another aspect of the invention, a structure of drone comprises:
- a frame comprising an engagement portion, said engagement portion being a strip having a predetermined geometry and being provided with a plurality of engagement positions;
- a plurality of propulsion elements;
- wherein each propulsion element is arranged to be engaged to the engagement portion at any of the engagement positions, in order to obtain a predetermined propulsion configuration among a plurality of possible obtainable propulsion configurations.

BRIEF DESCRIPTION OF THE DRAWINGS

Further characteristic and/or advantages of the present invention are more bright with the following description of some exemplary embodiments, exemplifying but not limitative, with reference to the attached drawings in which:

FIG. 2A shows, in a top plan view, the exemplary embodiment of FIG. 1, with three propulsion elements engaged to the frame;

FIG. 2C shows, in a top plan view, the exemplary embodiment of FIG. 1, with six propulsion elements engaged to the frame;

FIG. 3 shows, in a top plan view, a variant of the exemplary embodiment of FIG. 1 where the propulsion elements can slide on a rail;

FIG. 5 shows, in a top plan view, a third embodiment of the improved structure of drone wherein two parallel engagement portions are provided;

FIG. 6A shows a possible side view of any one of the embodiments of the structure of drone shown in FIGS. 1 to 3;

FIG. 6B shows a side view of the exemplary embodiment of the structure of drone shown in FIG. 5;

FIG. 8A shows, in a top plan view, the embodiment of FIG. 7, with three propulsion elements engaged to the frame;

FIG. 8B shows, in a top plan view, the embodiment of FIG. 7, with four propulsion elements engaged to the frame;

FIG. 8C shows, in a top plan view, the embodiment of FIG. 7, with six propulsion elements engaged to the frame;

FIG. 9 shows, in a top plan view, a fourth exemplary embodiment of the improved structure of drone wherein the load unit can rotate with respect to the frame;

DESCRIPTION OF A PREFERRED EXEMPLARY EMBODIMENT

Figure 1:
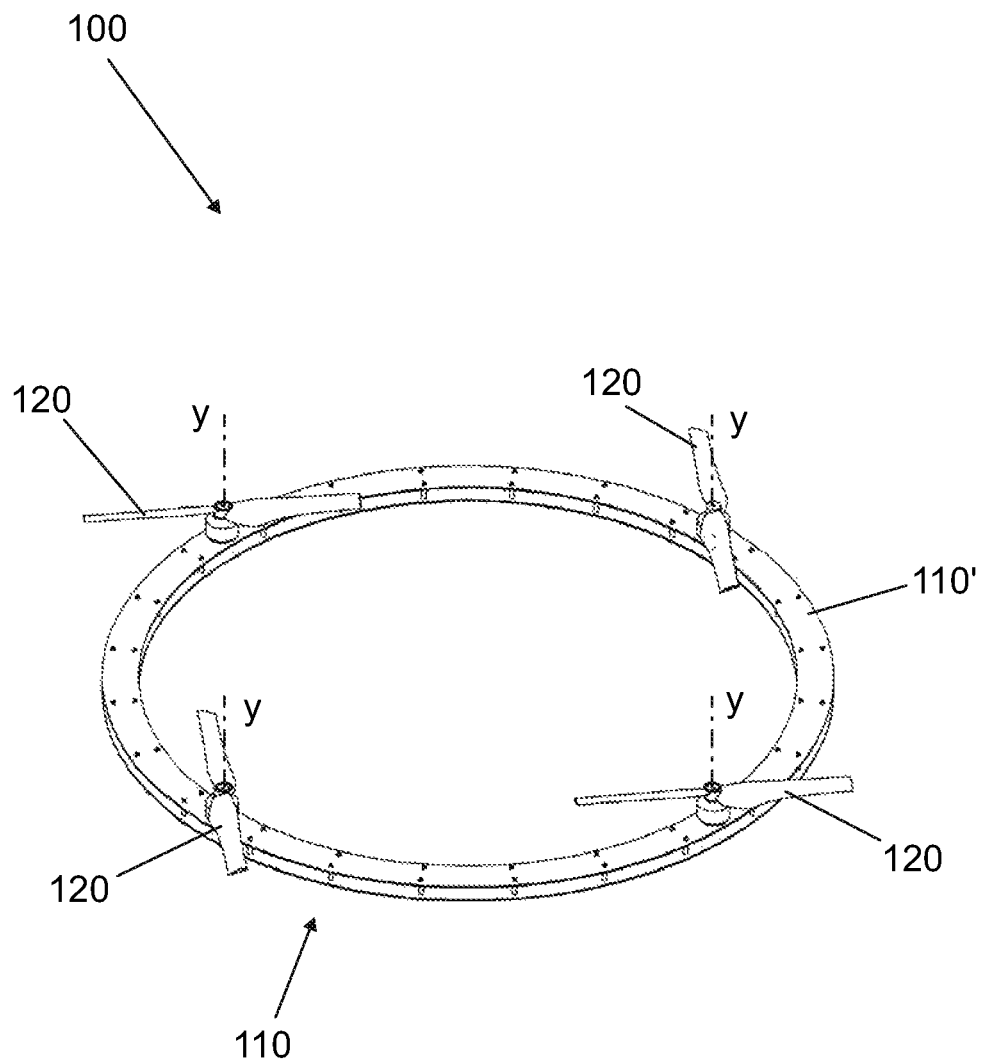
FIG. 1 shows, in a perspective view, a first exemplary embodiment of the improved structure of drone according to the present invention.

With reference to FIG. 1, a structure of drone 100 comprises a frame 110 having an engagement portion 110' substantially consisting of a circular strip, or ring. It is then provided a plurality of propulsion elements 120, in particular propellers having rotation axis y. Each propulsion element 120 can be engaged in a removable way to the engagement portion 110' in any point of the strip.

This particular structure of the frame 110 allows to overcome the drawbacks present in the drones of the prior art, both in terms of weight, and in terms of structural strength and protection by shocks. As shown, in fact, the present exemplary embodiment eliminates both the central body, present in all the prior art devices, and the rotor arms, further reducing the weight of the structure and avoiding the fatigue bending loads on the root of the arms. In particular, the engagement portion 110' can be hollow and provided with holes, in order to further reduce the weight, such as shown in an exemplary embodiment of FIG. 7. Furthermore, the engagement portion 110', being substantially peripheral, helps to protect the propulsion elements 120 from possible hits with obstacles in the flight path.

On the frame 110 may be placed sensors for the navigation of the drone and the visual recognition of the areas traversed, in addition to a control unit arranged to adjust the power supplied to the propulsion elements 120 and to receive, analysing and preferably transmitting the data collected by the board sensors.

In particular, the sensors for navigation may also comprise inertial sensors, such as gyroscopes and accelerometers, configured to detect weight imbalances of the drone, or of a possible load transported, and especially to provide informations about the flight trim and the response to commands. The control unit, receiving such informations by the inertial sensors can then increase, decrease, or differentiate the power supplied to the individual propulsion elements 120, in order to maintain the drone in trim of balance during the flight mission. Such aspect is particularly relevant, as well as during normal flight manoeuvres, also in case, for example, of wind gusts, material accidentally accumulated on the structure of drone 100, or in case of breakage of one of the propulsion elements.

The sensors for the visual recognition may instead comprise cameras and sensors for the scanning or the hyperspectral/multi spectral remote sensing.

Figure 2B:
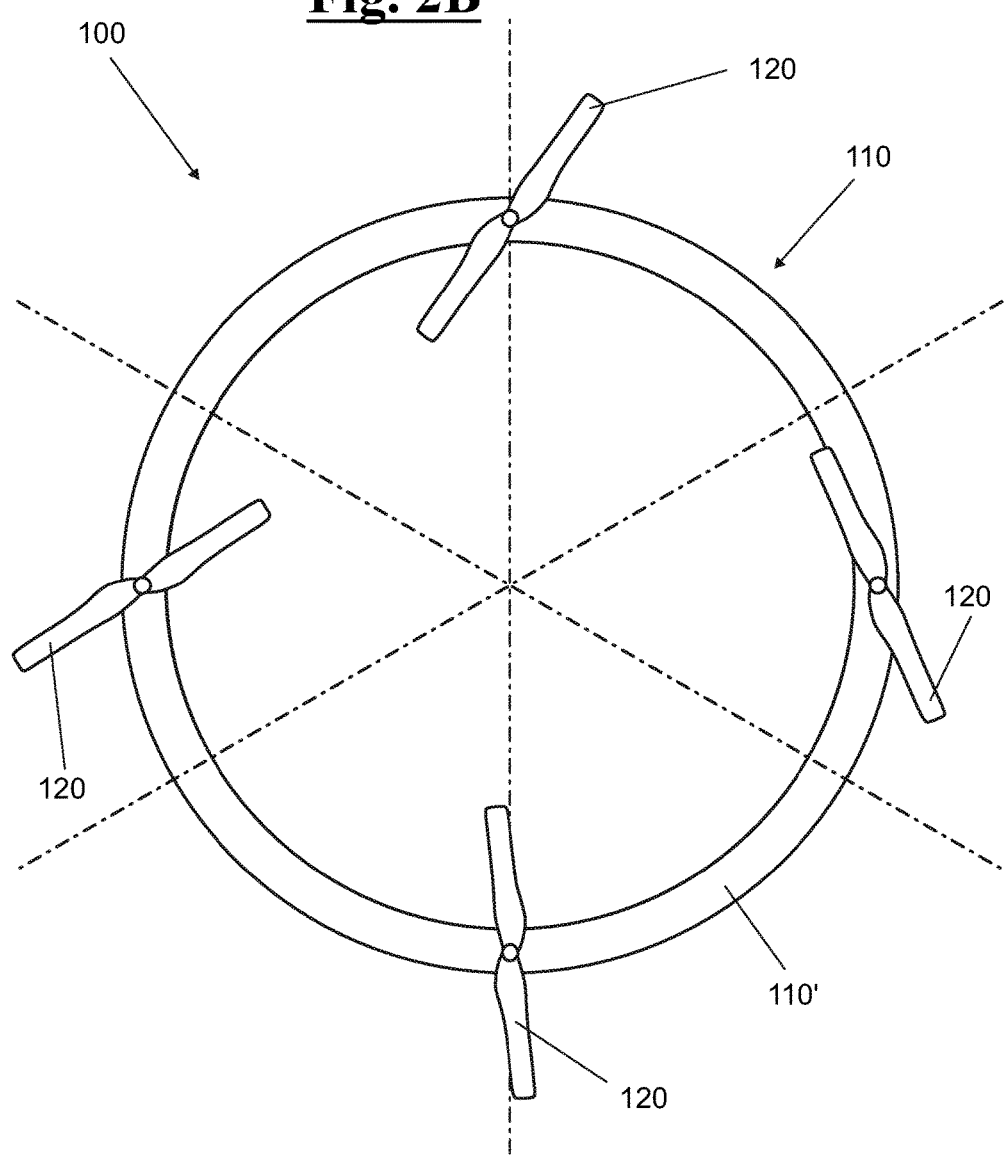
FIG. 2B shows, in a top plan view, the exemplary embodiment of FIG. 1, with four propulsion elements engaged to the frame.

With reference to FIGS. 2A, 2B and 2C, a further advantage given by the present invention resides in that the propulsion elements 120 are engageable at any point of the strip 110' allowing to realize different and complex configurations, or pattern. Passing, for example, from 3 to 4 to 6 propulsion elements 120, it is possible to change the lift force and the balance of the structure 100, making it very versatile for different flight missions.

This versatility can result very relevant in case of breakdown of a propulsion element 120. For example, if the drone is flying with 4 propulsion elements 120, arranged at 90°, and one of the elements 120 should break, it is possible to land the drone and changing the pattern of the propulsion elements 120, reducing them to 3 arranged at 120°, without the need to have a propulsion element 120 reserve. This way, the flight mission would not be excessively compromised, which would be instead the case of drones of the prior art, even with those in which it is possible to easily replace a rotor arm.

Furthermore, it is possible to create pattern where the propulsion elements 120 are non-axisymmetric with respect to the centre of the frame 110 and this it may allow the structure of drone 100 to carry and balance possible masses having a center of gravity not aligned with said center of the frame 110.

In particular, LED indicators can be provided at different points of the engagement portion 110', in such a way that the control unit can suggest to a user the optimal points at which to assemble the propulsion elements 120, in order to balance the drone.

Figure 4A:
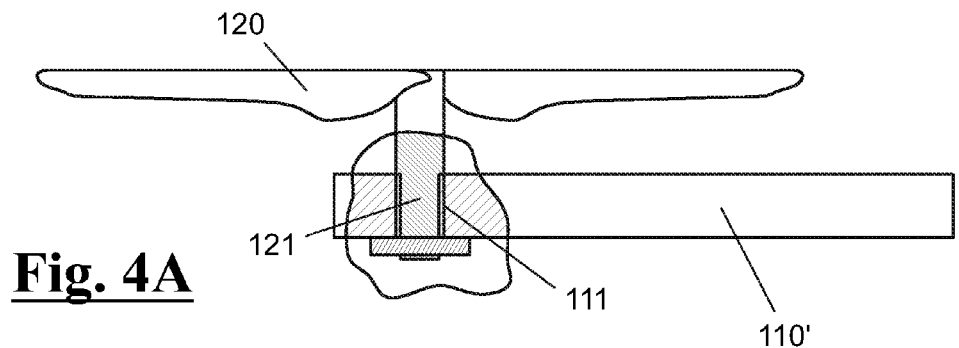
FIG. 4A shows, in a side view, a first exemplary embodiment of an engagement element arranged to engage a propulsion element with the engagement portion, wherein on the engagement portion threaded holes are provided within which propulsion elements screw.
Figure 4B:
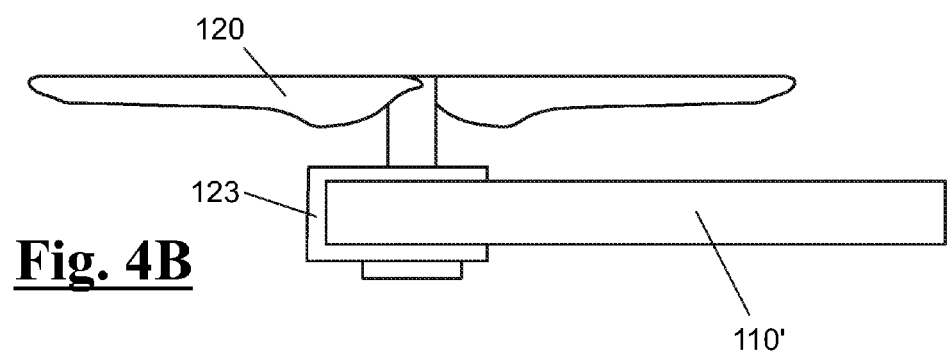
FIG. 4B shows, in a side view, a second exemplary embodiment of an engagement element, wherein the propulsion element is fixed to the engagement portion by means of a terminal.

With reference to FIG. 4B, a possible exemplary embodiment provides that the propulsion elements 120 are constrained to the engagement portion 110' by means of terminals 123.

Figure 4C:
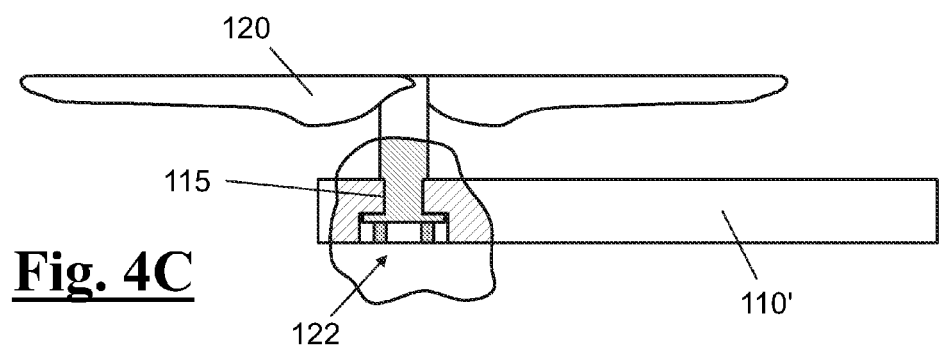
FIG. 4C shows, in a side view, a third exemplary embodiment of an engagement element, wherein the engagement portion comprises a rail in which the propulsion element can slide thanks to a carriage.

With reference to FIGS. 3 and 4C, another exemplary embodiment of the invention provides the presence of a rail 115. This way, it is possible to pass from a pattern to another with extreme ease and safety, simply by sliding the propulsion element 120 on a carriage 122 in the rail 115.

The major advantage of the exemplary embodiment of FIG. 3 is that, by installing the rotating actuators on the carriages 122, it is possible to automate the movement of the propulsion elements 120, making it possible to vary the pattern, and therefore the propulsion configuration, also during the flight, without the need to bring the drone to the base. Such variation can be performed remotely by a user, or can be automated and managed in real time by a control unit present on board of the drone.

As understandable, this advantage is essential since it greatly increases, with respect to the single variation of the power of the propulsion elements 120, the possibility of balance the structure of drone in case of breakdown of an propulsion element 120, or in case that the load transported by the drone is unbalanced with respect to the center of gravity of the structure of drone 100.

Figure 4D:
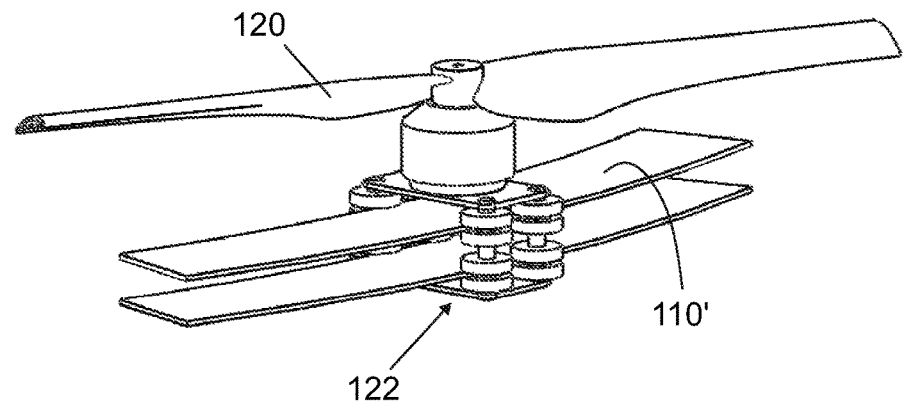
FIG. 4D shows, in perspective, an alternative embodiment of that of FIG. 4D, wherein the engagement element comprises a double carriage arranged to slide laterally on the engagement portion.
Figure 4E:
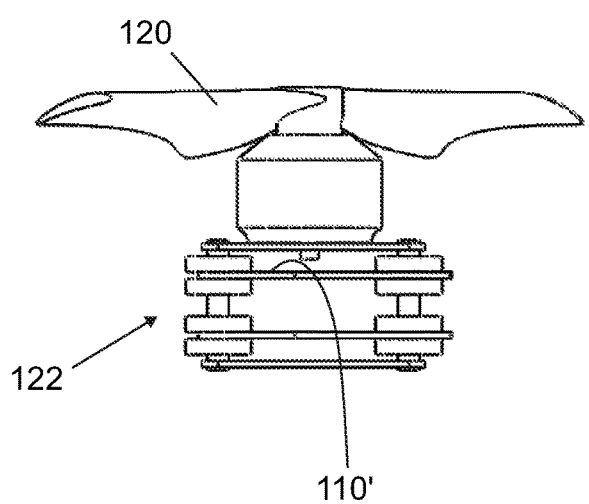
FIG. 4E shows a cross sectional view of the embodiment of FIG. 4D.

In FIGS. 4D and 4E an exemplary embodiment is shown similar to that of FIG. 4C, wherein the engagement portion 110' is formed by two laminar rings overlapped and the carriage 123 is disposed laterally, in order to use the edges of the two laminar rings as rails for the sliding of the propulsion elements 120.

In the exemplary embodiment of FIG. 4A, instead, threaded holes 111 are provided and each propulsion element 120 comprises a threaded portion 121 arranged to be inserted in any of the threaded holes 111, in order to engage the propulsion element 120 with the engagement portion 110'.

With reference to FIG. 5, the frame 110 may also comprise a secondary engagement portion 110" which also has a shape of strip having a predetermined geometry, in particular the same geometry of the engagement portion 110'. With reference even at FIG. 6B, the two engagement portions 110' and 110" are preferably located on parallel planes and allow to develop an higher lift than the solution which provides a single engagement portion. All the variants valid for the embodiment with a single engagement portion 110' remain valid also in case of the embodiment with two engagement portions.

FIGS. 6A and 6B show, in a side view, a comparison between the exemplary embodiment with an engagement portion 110' and the one wherein the secondary engagement portion 110" is added. In both embodiments also pedestals 119 may be provided arranged to assist the landing and the take-off of the drone and to keep up the structure 100 when it is on the ground.

With reference to FIGS. 7 to 12, the structure of drone 100 can also comprise a load unit 130 arranged to support a load and connected to the frame 110 by means of connecting arms 131.

Such embodiment can result very advantageous in case that sensors and control units are of excessive encumbrance and cannot be housed exclusively on the engagement portion 110'. Notwithstanding the weight of the structure 110 increases with respect to the embodiment of FIG. 1, also in this exemplary embodiment the overall weight is reduced with respect to solutions of the prior art, since it is not essential to have a connecting arm for each propulsion element 120. Furthermore, you retain all of the advantages in terms of structural resistance and shocks protection.

Figure 7:
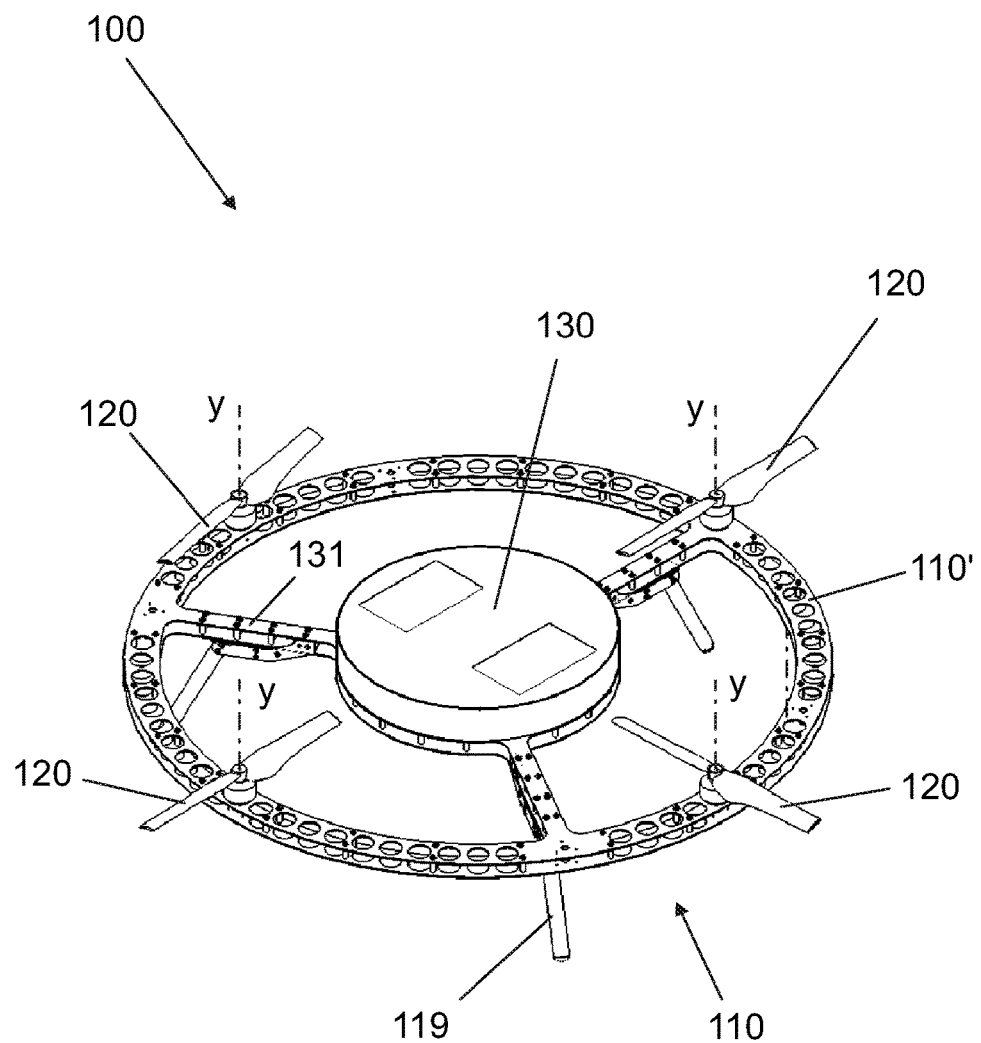
FIG. 7 shows, in a top plan view, a second exemplary embodiment of the improved structure of drone wherein also the load unit is present.

With reference to FIGS. 8A, 8B and 8C, also the embodiment of FIG. 7 allows changing the arrangement of the propulsion elements 120 according to the reasons of the flight mission. More generally, all the variants of the exemplary embodiment of FIG. 1 can be similarly implemented to the embodiment of FIG. 7.

In FIG. 9 an exemplary embodiment is shown wherein there are two connecting arms 131 instead of 3. The two arms 131, aligned along a x axis, allow the load unit 130 to carry out a relative rotation with respect to the frame 110. Such solution can be particularly useful for example in case it is necessary to perform remote sensing to 360°.

In a advantageous variant of the exemplary embodiment of FIG. 9, the cross sectional view of the arms 131 is an aerodynamic profile, similar to that of an airplane wing, in order to create a lift force when the arms 131 are invested by an air flow with a speed higher than a predetermined value. Such solution can be useful both to increase the overall lift of the drone, and especially to keep a constant vertical lift during the steps of manoeuvre. If, for example, the drone must perform a change of direction, the frame 110 can be tilted by rotating about its axis x due to a differentiated power between the various propulsion elements 120. Such manoeuvre causes a reduction of the vertical component of the lift generated by the propellers 120 in favour of an horizontal component necessary to the directional change. In this case, since the arms 131 do not rotate together with the frame 131, the contribution of lift given by their aerodynamic profiles remains vertical, compensating the decrease of the vertical component of lift of the propulsion elements 120.

In particular, in the embodiment above described, the two arms 131 may have rotations independent from one another about the axis x. This way, similarly to what happens during the turn of an airplane, the two arms 131 can act as ailerons and dispose with opposite incidences.

In doing so, a first arm 131 creates a positive lift and the second arm 131 creates a negative one, generating a rolling moment that allows indeed the turn of the whole structure of drone.

Figure 10:
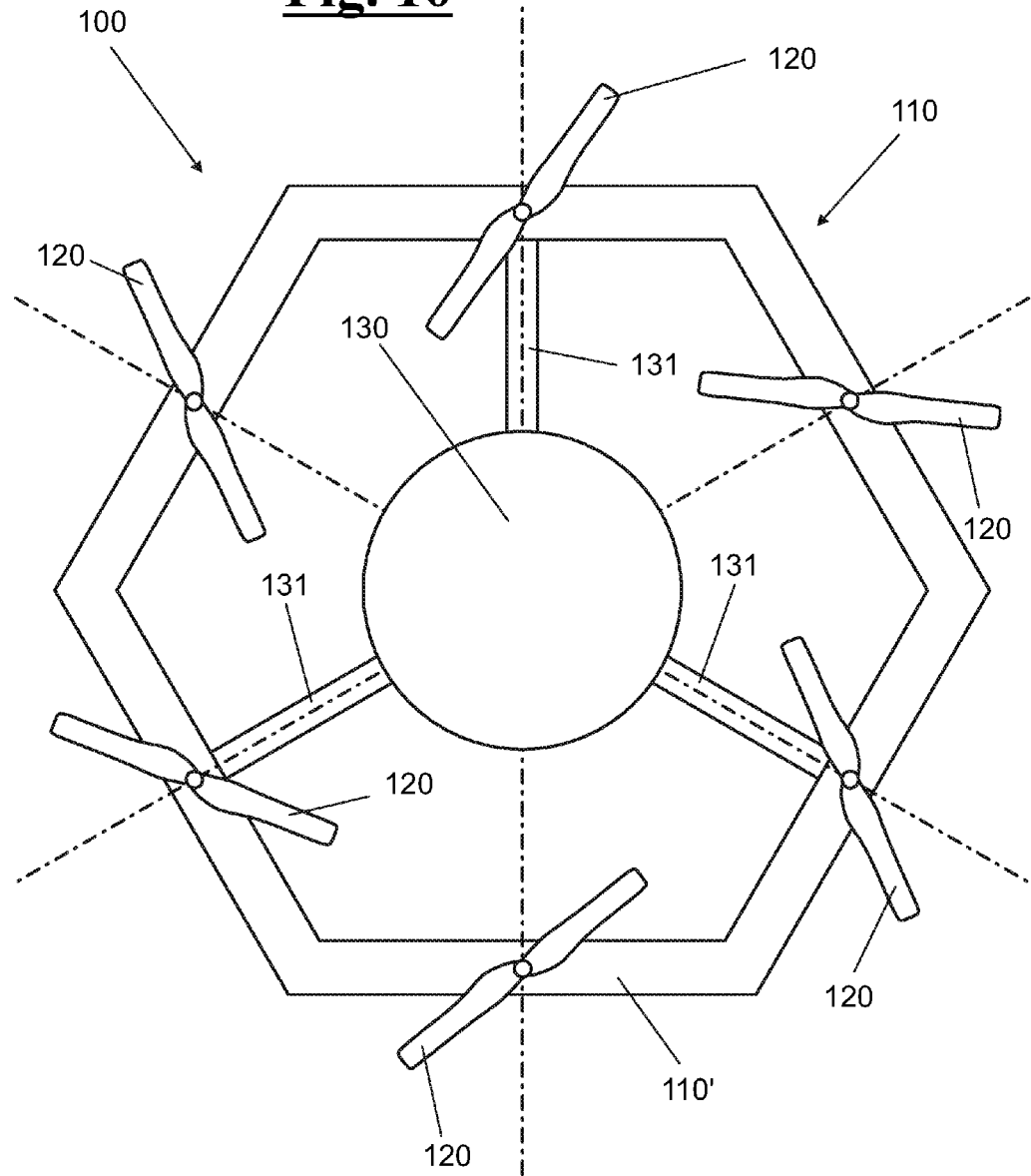
FIG. 10 shows, in a top plan view, a fifth exemplary embodiment of the improved structure of drone wherein the engagement portion of the frame has hexagonal shape.

In FIG. 10 an exemplary embodiment is shown wherein the engagement portion 110' has hexagonal shape instead of circular shape. More generally, the engagement portion 110' may have polygonal shape with any number of sides.

Figure 11:
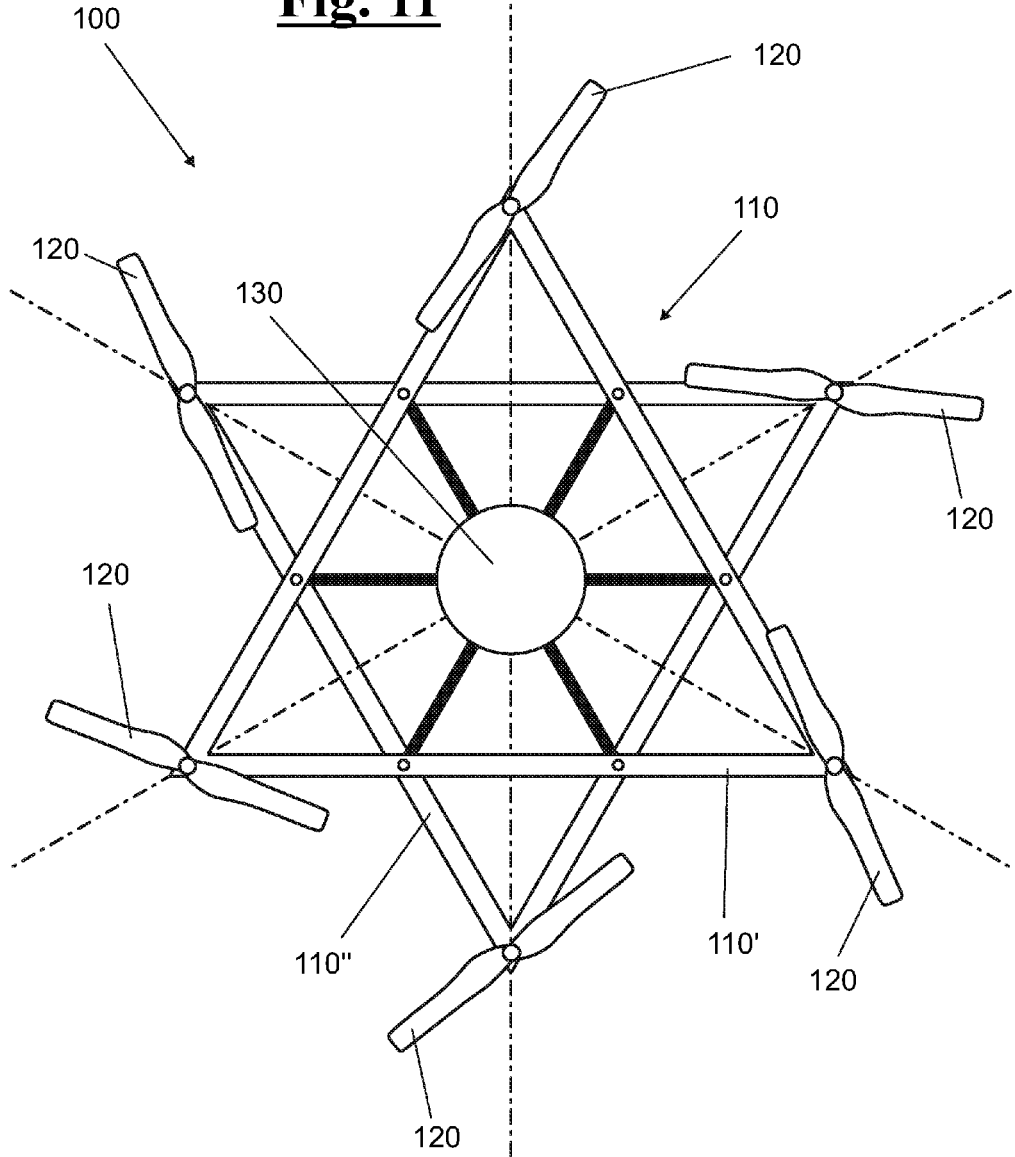
FIG. 11 shows, in a top plan view, a sixth exemplary embodiment of the improved structure of drone wherein two engagement portions with triangular shape are overlapped.

In FIG. 11 an exemplary embodiment is shown wherein two engagement portions 110' and 110" are provided having both triangular shape and disposed on parallel planes to each other.

Figure 12:
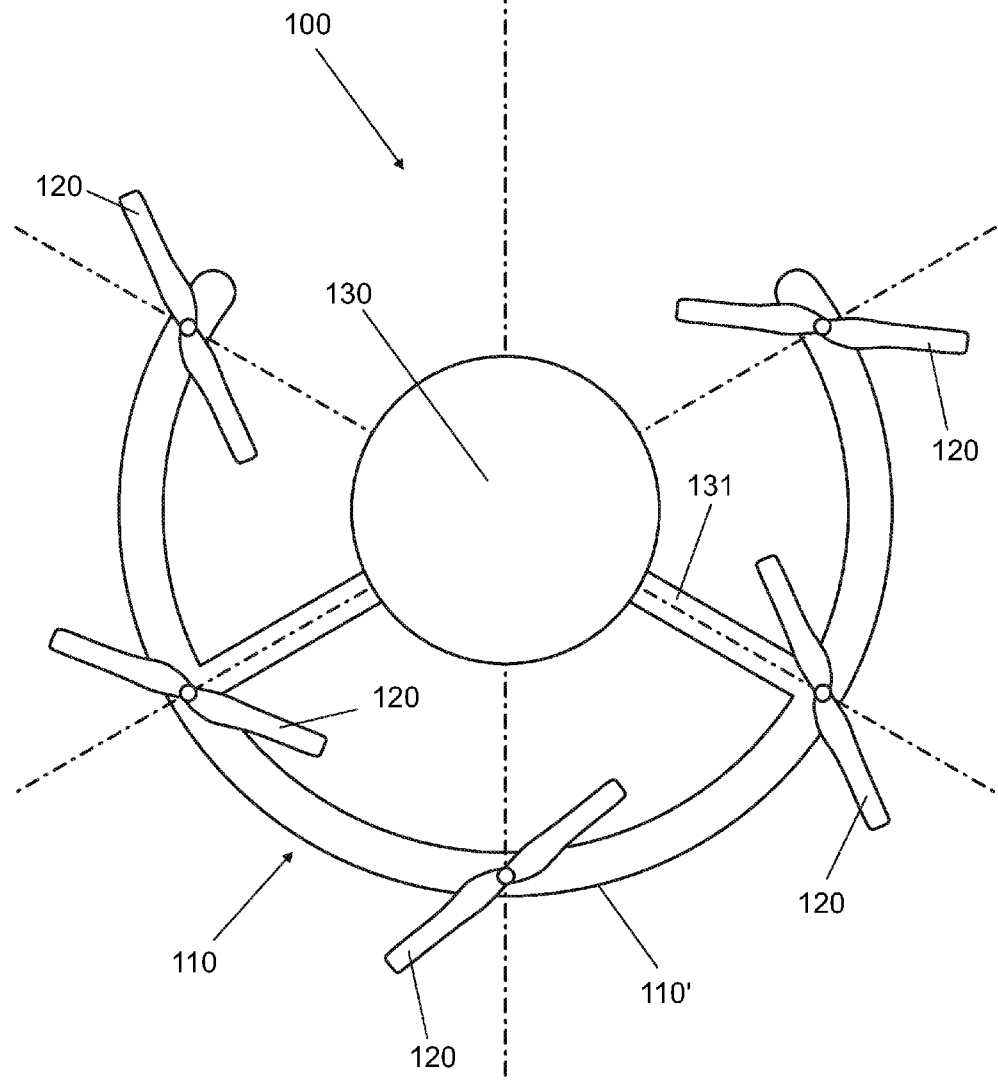
FIG. 12 shows, in a top plan view, a seventh exemplary embodiment of the improved structure of drone wherein the frame has is C-shaped.

In FIG. 12 an exemplary embodiment is shown where the engagement portion 110' is C-shaped and not annular as the previous. Such solution can result useful to increase the field of view of possible cameras located on the structure 100.

In all the exemplary embodiments described, the propulsion elements 120 can be connected to the control unit via radio or Bluetooth. The electric current can instead being transmitted by means of cables, electric paths glued on the frame 110, or also by means of electromagnetic induction. In any case, the accumulators of current can be located both on the frame 110 and on the load unit 130.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A structure of a drone comprising: a frame comprising an engagement portion, said engagement portion being in a form of a strip having a predetermined geometry; and a plurality of propulsion elements arranged on said engagement portion; wherein each one of the plurality of propulsion elements is removably engaged with said engagement portion at any position on said engagement portion to facilitate changing a number and an arrangement of said plurality of propulsion elements on said engagement portion wherein said frame comprises an actuator arranged to automatically cause said propulsion elements to slide on said engagement portion during a flight mission.

2. The structure according to claim 1, wherein each one of said plurality of propulsion elements is slidingly mounted on said engagement portion in order to be arranged from a starting engagement position to a final engagement position, different from said starting engagement position, through a sliding along said engagement portion, while remaining engaged to said frame.

3. The structure according to claim 1, wherein said predetermined geometry is selected from the group consisting of:
- an annular geometry with a circular plan;
- a geometry with a square plan;
- a geometry with a triangular plan;
- a geometry with an hexagonal plan; and
- a C-shaped geometry.

4. The structure according to claim 1, wherein said engagement portion has a plurality of engagement positions, and wherein each one of said plurality of said propulsion elements is engaged to said engagement portion at any one of said plurality of engagement positions, in order to obtain a predetermined propulsion configuration among a plurality of possible obtainable propulsion configurations.

5. The structure according to claim 1, wherein said frame further comprises a secondary engagement portion having a shape of a strip with a predetermined geometry.

6. The structure according to claim 1, further comprising a load unit connected to said frame, said load unit being arranged to support a predetermined load.

7. The structure according to claim 1, further comprising an inertial sensor is also provided for carrying out a detection of the distribution of the masses of said structure of drone and/or of a possible additional load, said at least one inertial sensor being arranged to transmit said detection to a control unit, said control unit arranged to determine in a differential way the power and/or the engagement position of each propulsion element, in order to obtain a predetermined propulsion configuration.

8. The structure according to claim 4, wherein an LED indicator is arranged at each engagement position.

9. The structure according to claim 1, wherein each one of said plurality of propulsion elements is engaged to said engagement portion with an engagement element selected from the group consisting of:
- a mechanical vice;
- a snap closure;
- a magnet;
- an electromagnet;
- an adhesive element;
- an interlocking wheel-rail; and
- a combination thereof.

10. The structure according to claim 1 wherein said actuator comprises a carriage, or a rotating actuator, arranged to cause the sliding of said propulsion elements on said engagement portion in an automatic way or with remote controls.

11. A structure drone comprising: a frame comprising an engagement portion, said engagement portion being in a form of a strip having a predetermined geometry and being equipped with a plurality of engagement positions; a plurality of propulsion elements arranged on said engagement portion; wherein each one of said plurality of propulsion elements is adapted to be engaged to said engagement portion at any of said engagement positions, in order to obtain a predetermined propulsion configuration among a plurality of possible obtainable propulsion configurations; and wherein said frame comprises an actuator arranged to automatically cause said propulsion elements to slide on said engagement portion during a flight mission.

12. A structure of a drone comprising:
- a frame comprising an engagement portion, said engagement portion being in a form of a strip having a predetermined geometry; and
- a plurality of propulsion elements arranged on said engagement portion;
- wherein each one of the plurality of propulsion elements is removably engaged with said engagement portion at any position on said engagement portion to facilitate changing a number and an arrangement of said plurality of propulsion elements on said engagement portion; and
- an LED indicator arranged at each one of said plurality of engagement positions,
- wherein said frame comprises an actuator arranged to automatically cause said propulsion elements to slide on said engagement portion during a flight mission.

* * * * *